United States Patent

Burg et al.

[11] Patent Number: 5,419,622
[45] Date of Patent: May 30, 1995

[54] DRIVE-SLIP CONTROL SYSTEM

[75] Inventors: Andreas Burg, Asperg; Thomas Isella; Johannes Schmitt, both of Markgröningen, all of Germany

[73] Assignee: Robert Bosch GmbH, Stuttgart, Germany

[21] Appl. No.: 182,082

[22] PCT Filed: Jun. 19, 1992

[86] PCT No.: PCT/DE92/00503

§ 371 Date: Jan. 12, 1994

§ 102(e) Date: Jan. 12, 1994

[87] PCT Pub. No.: WO93/01960

PCT Pub. Date: Feb. 4, 1993

[30] Foreign Application Priority Data

Jul. 18, 1991 [DE] Germany ............ 41 23 783.8

[51] Int. Cl.[6] ............... B60T 8/32; B60T 8/00; B60K 28/16
[52] U.S. Cl. .................. 303/100; 303/96; 303/102; 303/110; 180/197
[58] Field of Search ............ 303/91, 93, 110, 100, 303/113.1, 113.2, 61, 96, 98, 97, 102, 103, 111; 180/197, 233, 244, 248, 249, 250; 188/181 A, 181 C; 364/426.01, 426.02, 426.03, 424.01

[56] References Cited

U.S. PATENT DOCUMENTS

| 4,950,037 | 8/1990 | Kopper et al. ............ 303/110 |
| 5,058,699 | 10/1991 | Fennel et al. ............ 180/197 |
| 5,131,730 | 7/1992 | Kollers et al. . |

FOREIGN PATENT DOCUMENTS

| 2213859 | 8/1974 | France . |
| 2230540C2 | 1/1981 | Germany . |
| 3540708A1 | 5/1987 | Germany . |
| 3912865A1 | 11/1989 | Germany . |
| 3818260A1 | 12/1989 | Germany . |
| 3916990A1 | 12/1989 | Germany . |
| 3923853C1 | 10/1990 | Germany . |
| 2175717 | 12/1986 | United Kingdom . |
| 2217479 | 10/1989 | United Kingdom . |
| 87/02948 | 5/1987 | WIPO . |

*Primary Examiner*—Douglas C. Butler
*Attorney, Agent, or Firm*—Spencer, Frank & Schneider

[57] ABSTRACT

Described is a drive-slip control system in which increase and reduction in pressure are produced by series of pulses. The pulse lengths are selected such that each pulse produces the same change in pressure. The difference between pressure-increase and pressure-reduction pulses is then a measure of the pressure at the wheel brake and can, for instance, be taken into account in an additionally fitted engine-torque governor.

5 Claims, 1 Drawing Sheet

| Buildup [ms] | +30 | 20 | 15 | 15 | 15 | 15 | 15 | 15 | 20 | 20 | 30 | 30 | 40 | 50 | 50 | 50 |
|---|---|---|---|---|---|---|---|---|---|---|---|---|---|---|---|---|
| Pulse Counter | 15 | 14 | 13 | 12 | 11 | 10 | 9 | 8 | 7 | 6 | 5 | 4 | 3 | 2 | 1 | 0 |
| Reduction [ms] | 300 | 25 | 15 | 10 | 10 | 10 | 5 | 5 | 5 | 5 | 5 | 5 | 5 | 5 | 5 | 5 |

DRIVE-SLIP CONTROL SYSTEM

BACKGROUND OF THE INVENTION

A drive-slip control system is known, for example, from WO 87/02948.

SUMMARY OF THE INVENTION

With the invention, the braking pressure supplied to the individual brakes, and hence the braking moment, is determined with close approximation in a simple and inexpensive manner. The present differential blocking effect is known from a comparison of the pulse differences of the two driven wheels. This information can be taken into consideration, for example, in a likewise existing engine moment controller, and this controller can thus be designed more adaptively. A correlation is possible between the driving moment and the braking moment.

The built-up locking moment between the driving wheels may be determined and influenced. The driving situation may be assessed from the known pressure level (locking moment).

In the invention, pressure buildup and reduction times are determined for the successive pulses leading to desired changes in pressure in the wheel cylinders, taking into consideration the pressure volume characteristic and other marginal conditions. These successively occurring changes in pressure may be selected (determined) arbitrarily, but they may also be selected to be of the same magnitude. Preferable a count of a forward-backward counter is set for each of the pressure stages and is allocated pulse times for pressure buildup and reduction. These times are preferably determined in tests.

BRIEF DESCRIPTION OF THE DRAWINGS

An embodiment of the invention is described with reference to the drawing in which.

DESCRIPTION OF A PREFERRED EMBODIMENT

Figures 1, 2:
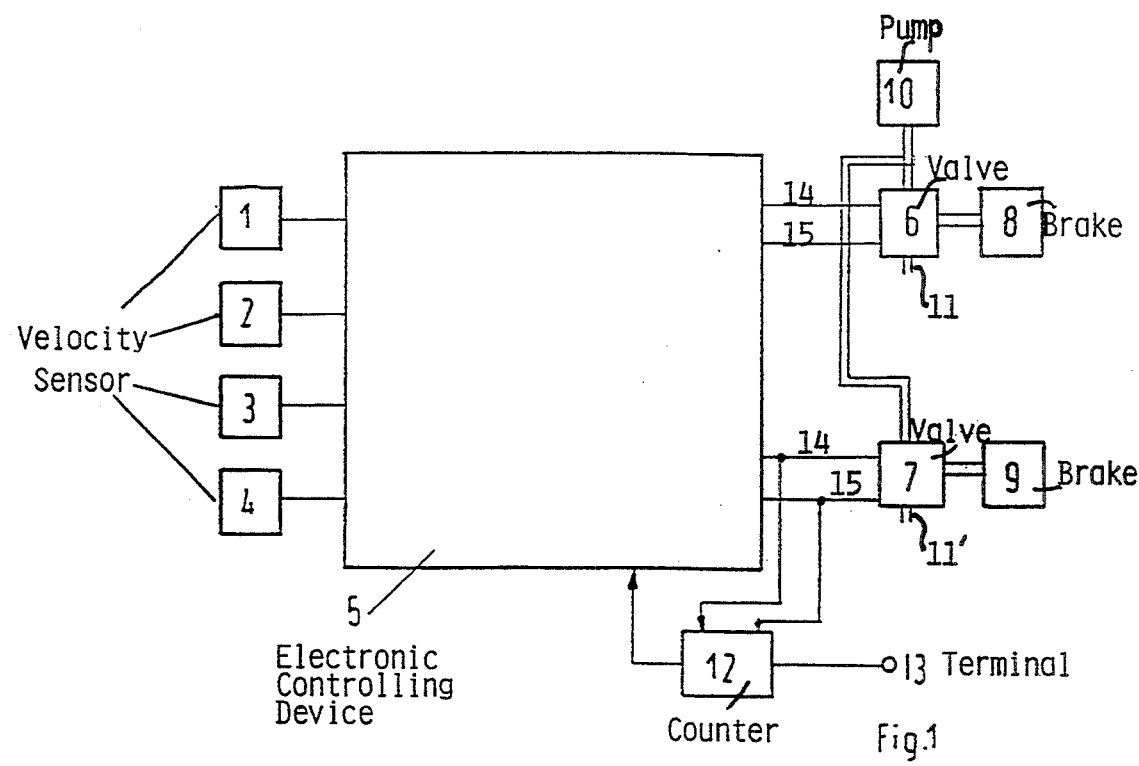
FIG. 1 illustrates a block circuit diagram of a drive slip control system according to the invention.
FIG. 2 is a table showing the times for pressure buildup and reduction pulses in relation to the position of the counter.

FIG. 1 shows a block circuit diagram of a drive slip control system having velocity sensors 1 to 4 associated with the driven wheels and the nondriven wheels. From the sensor signals, an electronic control device 5 obtains control signals in a known manner for the driven wheels that indicate whether a tendency to spin exists (standard deviation BRA>0). If this is the case, pulses are emitted from the control device by way of the upper lines 14; during the pulse time, these pulses set valves 6 and 7, respectively, in the position in which pressure from the pressure source line, pump 10 is applied to the brakes 8 and 9, respectively. If the control signal then disappears (BRA<0), then pressure reduction pulses are fed by way of the lower lines 15 to valves 6 and 7, which connect the brake cylinders to return lines 11 and 11, respectively, which are only partially indicated here.

The inputs of a forward-backward counter 12 are connected to the lines 14, 15 to valve 7 (the input lines for valve 6 are not shown). At the beginning of a regulating process, the counter is always in an initial position, for example position 15 (FIG. 2). A pulse time $T_1$ for a pressure buildup pulse and a different time $T_1$, for a pressure reduction pulse are allocated to this position in the control device. The occurrence of the control signal (BRA>0) activates the first pulse with time $T_1$, thus building up pressure. The end of the pulse moves the counter 12 on by one position into position 14. This position is also allocated pulses with durations $T_2$ and $T_2'$; the durations are determined in such a way that an identical change in pressure of, for example, 10 bar takes place with each pulse (whether buildup or reduction). The pressure buildup pulses are fed to valve 7 until the control signal disappears (BRA<0), for instance when counter position 10 is reached. Now a pressure reduction pulse is activated, with the pressure reduction pulse duration associated with position 10, the counter is brought into position 11, and further reduction pulses follow until the control signal (BRA>0) reappears, or the end of the regulation process is recognized.

FIG. 2 shows a table whose middle line gives the positions of the counter 12, and whose other two lines give the times for the pressure buildup and pressure reduction pulses that cause the predetermined, desired change in pressure at the respective existing pressure level.

A signal that identifies the momentary position of the counter 12 is put out at a terminal 13; this signal is a measure of the existing pressure and can be further processed.

If the pump for generating pressure in a drive slip control system is not activated until the first pressure buildup pulse, this fact must be taken into consideration through a longer pulse time of this pulse. On the other hand, with simultaneous pressure buildup on both sides it is also necessary to select different pulse times. Therefore, it must be possible to switch pulse times.

We claim:

1. A drive slip control system for a motor vehicle having driven wheels, comprising:
    a brake for each respective driven wheel, each said brake being activated by an applied pressure;
    a pressure supply means for supplying a source pressure;
    a plurality of pressure-altering valves, each being in communication with the pressure supply means and with a respective brake, each said pressure-altering valve being activatable for varying the applied pressure at a respective brake; and
    control means connected to the respective pressure-altering valves and selectively producing a series of pressure buildup pulses and pressure reduction pulses for activating the respective pressure-altering valves for varying the applied pressure, the pulses of each series having predetermined durations selected so that the applied pressure at a respective brake is increased and decreased, respectively, by a predetermined amount of pressure with each pulse, whereby an existing applied pressure is determined from the predetermined amount of pressure associated with each pulse and from a number of pressure buildup pulses and pressure reduction pulses being applied.

2. A drive slip control system as defined in claim 1, wherein each pulse changes the applied pressure by a substantially identical increment, and a magnitude of the applied braking pressure is determined from a difference between the number of applied pressure buildup pulses and pressure reduction pulses, and from the incremental change in pressure per pulse.

3. A drive slip control system as defined in claim 2, further comprising a forward-backward counter operatively coupled with said central means for forming the difference.

4. A drive slip control system as defined in claim 1, wherein said pressure supply means comprises a pressure pump, said control means compensating for an initial activation of said pressure pump by varying an initial pressure buildup pulse duration.

5. A drive slip control system as defined in claim 1, wherein said control means compensates for a pressure buildup pulse occurring at two pressure-altering valves by adjusting a respective pressure buildup and reduction pulse duration.

* * * * *